(12) United States Patent
Raieszadeh et al.

(10) Patent No.: US 9,097,578 B2
(45) Date of Patent: Aug. 4, 2015

(54) INFRARED SENSING USING PYRO/PIEZO-ELECTRIC RESONATORS

(75) Inventors: Mina Raieszadeh, Ann Arbor, MI (US); Vikrant Jayant Gokhale, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 483 days.

(21) Appl. No.: 13/470,996

(22) Filed: May 14, 2012

(65) Prior Publication Data
US 2012/0286161 A1  Nov. 15, 2012

Related U.S. Application Data

(60) Provisional application No. 61/485,976, filed on May 13, 2011.

(51) Int. Cl.
*G01J 5/06* (2006.01)
*G01J 5/08* (2006.01)
*G01J 5/58* (2006.01)

(52) U.S. Cl.
CPC ............... *G01J 5/06* (2013.01); *G01J 5/0853* (2013.01); *G01J 5/58* (2013.01)

(58) Field of Classification Search
CPC .............. G01J 5/06; G01J 5/0853; G01J 5/58
USPC .......................................... 250/338.1, 338.3
See application file for complete search history.

(56) References Cited

U.S. PATENT DOCUMENTS

| | | | |
|---|---|---|---|
| 5,508,546 A * | 4/1996 | Zalameda et al. | 250/338.3 |
| 6,361,825 B1 * | 3/2002 | Beratan et al. | 427/126.1 |
| 2007/0194237 A1 * | 8/2007 | Wagner et al. | 250/332 |
| 2012/0018635 A1 * | 1/2012 | Takizawa et al. | 250/338.3 |
| 2013/0214158 A1 * | 8/2013 | Kaufman et al. | 250/338.1 |

OTHER PUBLICATIONS

W. D. Nothwang et al., "Army Materials Research: Transferring Land Combat Through New Technologies", AMPTIAC Quarterly, vol. 8, No. 4, Nov. 2004, pp. 1-132.
A. Rogalski, "Infrared Detectors: Status and Trends," Progress in Quantum Electronics 27 (2003) 59-210.
M.S. Shur et al., "Pyroelectric and Piezoelectric Properties of Gan-Based Materials," MRS Internet J. Nitride Semicond. Res. 4S1, 10, 1999, G1.6.

(Continued)

*Primary Examiner* — David Porta
*Assistant Examiner* — Mindy Vu
(74) *Attorney, Agent, or Firm* — Reising Ethington P.C.

(57) ABSTRACT

An infrared sensor formed from a resonant sensor element having a mechanical resonator and an IR absorber arranged to receive and absorb incident infrared radiation. The resonator includes a temperature-responsive material that exhibits pyroelectric and piezoelectric effects. The IR absorber is thermally coupled to the resonator such that the resonator receives thermal energy from at least some of the incident infrared radiation absorbed by the IR absorber. The resonator has at least one resonant characteristic that varies based on the amount of thermal energy received from the IR absorber by the resonator. A sensor array and infrared sensing method are included that use a plurality of the infrared sensors along with a reference sensor having the same construction as the other sensor elements, except that the sensor either lacks the IR absorber or has it arranged so that it is not exposed to the incident infrared radiation.

18 Claims, 9 Drawing Sheets

(56) References Cited

OTHER PUBLICATIONS

S. K. Abdelraheem et al., Phys. Stat. Sol. (a), vol. 185, No. 2, pp. 247-256, 2001.

A. R. Hutson et al., "Ultrasonic Amplification in CdS," Physical Review Letters, vol. 7, No. 6, pp. 237-240, 1961.

M. Rotter et al., "Quasi-Monolithic GaAs/LiNbO3-Hybrids for Acoustoelectric Applications," IEEE Ultrasonics Symposium, vol. 1, pp. 201-204, 1997.

R. Tabrizian et al., "Effect of Phonon Interactions on Limiting the f·Q Product of Micromechanical Resonators," Solid-State Sensors, Actuators and Microsystems Conference, pp. 2131-2134, Jun. 2009.

S. Y. Mensah et al., "Propagation of Ultrasonic Waves in Bulk Gallium Nitride (GaN) Semiconductor in the Presence of High-Frequency Electric Field," Physica E, vol. 28, pp. 500-506, 2005.

V. J. Gokhale, "Q Amplification in GaN Thickness Mode Filters Using Acoustoelectric Effect," Hilton Head Workshop, submitted, 2010.

R. D. Grober et al., "Fundamental Limits to Force Detection Using Quartz Tuning Forks," Rev of Scientific Instruments, 71, 2776, Jul. 2000.

T. D. Stowe et al, "Attonewton Force Detection Using Ultrathin Silicon Cantilevers," Applied Physics Letters, 71, 288, 1997.

Y. Hatanaka et al., "Transient Thermal Analysis and Experiments of Pyroelectric Detectors," Japanese Journal of Applied Physics, vol. 11, No. 12, Dec. 1972, pp. 1788-1796.

H. M. Lavasani et al., "A 145 MHz Low Phase-Noise Capacitive Silicon Micromechanical Oscillator," IEEE IEDM, pp. 675-678, Dec. 2008.

"Characteristics and Use of Infrared Detectors," HAMAMASTSU Inc, http://sales.hamamatsu.com/assets/applications/SSD/Characteristics_and_use_of_infrared_detectors.pdf, pp. 1-43.

N.T. Gordon et al., "Application of Microlenses to Infrared Detector Arrays," Infrared Physics, vol. 31, No. 6, 1991, pp. 599-604.

J. R. Vig et al., "Uncooled IR Imaging Array Based on Quartz Microresonators," Journal of Microelectromechanical Systems, vol. 5, No. 2, Jun. 1996.

Cabuz, C. et al., "Fabrication and Packaging of a Resonant Infrared Sensor Integrated in Silicon," Sensors and Actuators A, 43, 92-99 (1994).

Kao, P. et al., "Micromachined Quartz Resonator Based Infrared Detector Array," Sensors and Actuators A, 149, 189-192 (2009).

Shur, M. S. et al., "Pyroelectric and Piezoelectric Properties of GaN-Based Materials," Proc. MRS, 537, G1.6 (1998).

Rogalski, A., "Infrared Detectors: Status and Trends," Progress in quantum electronics, 27, 59-210, (2003).

Vig, J. R. et al., "Uncooled IR Imaging Array Based on Quartz Microresonators," J. Microelectromech. Sys. 5(2), 131-138 (1996).

Lehman, J. H. et al., "Gold-Black Coatings for Freestanding Pyroelectric Detectors," Meas. Sci. Technol. 14, 916-922 (2003).

Mellouki, I. et al., "IR Characterization of Graphite Black Coating for Cryogenic Detectors," Infrared Phys. And Tech., 50, 58-62 (2007).

Sui, Y. et al., "A Thin-Film Infrared Absorber using CNT/Nanodiamond Nanocomposite," Proc. MRS, (2012).

Sichel, E. K. et al., "Thermal Conductivity of GaN," J. Phys. Chem. Solids 38(3), 330 (1977).

Willatzen, M. et al., "Static and Dynamic Effects Due to Electrostriction in GaN/AlGaN," J. Phys.: Condens. Matt. 19, 506202-506221 (2007).

Bykhovski, A. D. et al., "Elastic Strain Relaxation and Piezoeffect in GaN—AlN, GaN—AlGaN and GaN—InGaN Superlattices," J. Appl. Phys. 81(9), 6332-6338 (1997).

Polian, A. et al.., "Elastic Constants of Gallium Nitride," J. Appl. Phys. 79(6), 3343-3344 (1996).

Gokhale, V. J. et al., "High Performance Bulk Mode Gallium Nitride Resonators and Filters," Solid-State Sensors, Actuatorsand Microsystems Conference (Transducers), 926-929 (2011).

Ansari, A. et al., "Gallium Nitride-on-Silicon Micromechanical Overtone Resonators and Filters," Proc. Tech. Dig. Int. Electron Devices Meeting, 485-488 (2011).

Gokhale, V. J. et al., "Observation of the Acoustoelectric Effect in Gallium Nitride Micromechanical Bulk Acoustic Filters," Proc. IEEE Int. Freq. Cont. Symp., 524-529 (2010).

Faucher, M. et al., "Amplified Piezoelectric Transduction of Nanoscale Motion in Gallium Nitride Electromechanical Resonators," Appl. Phys. Lett., 94, 233506 (2009).

Müller, A. et al., "GaN Micromachined FBAR Structures for Microwave Applications," Superlattices and Microstructures, 40, 426-431 (2006).

Rais-Zadeh, M., "Gallium Nitride Micromechanical Resonators for IR Detection," Invited Paper, Proc. SPIE, (2012).

Guy, I.L. et al., "Electrostriction in Gallium Nitride," Appl. Phys. Lett, 75, 3641 (1999).

Gokhale, V.J. et al., "Novel Uncooled Detector Based on Gallium Nitride Micromechanical Resonators," Proc. SPIE, (2012).

Mizuno, K. et al., "A Black Body Absorber from Vertically Aligned Single-Walled Carbon Nanotubes," Proc. Nat. Acad. Sci., 106 (15), 6044-6047 (2009).

Albrecht, T.R. et al., "Frequency Modulation Detection Using High-Q Cantilevers for Enhanced Force Microscope Sensitivity," J, Appl. Phys., 69(2), 668-673 (1991).

Wang, K. et al., "VHF Free-Free Beam High-Q Micromechanical Resonators," J. Microelectromech. Syst., 9(3), 347-360 (2000).

Tabrizian, R. et al., "Effect of Phonon Interactions on Limiting the f.Q Product of Micromechanical Resonators," Solid-State Sensors, Actuators and Microsystems Conference (Transducers), 2131-2134 (2009).

Chandorkar, S. A. et al., "Limits of Quality Factor in Bulk-Mode Micromechanical Resonators," Proc. IEEE Conf. Microelectromech. Sys., 13-17 (2008).

Kruse, P.W., "A Comparison of the Limits to the Performance of Thermal and Photon Detector Imaging Arrays," Infrared Phys. Technol., 36, 869-882 (1995).

\* cited by examiner

INFRARED SENSING USING PYRO/PIEZO-ELECTRIC RESONATORS

TECHNICAL FIELD

This invention relates to uncooled focal plane array sensors used for thermal imaging.

BACKGROUND OF THE INVENTION

In recent years, there has been a growing interest in high-precision infrared (IR) detectors for applications ranging from military and security to automotive and consumer markets. An infrared detector can be used for sensing of objects (for example human objects) day and night and in cases where salt, dust, heavy rain, snow, blowing sand, or petroleum vapor is present; all conditions that would seriously limit optical vision. The IR detectors are also called IR sensors and can be placed in an array to form a focal plane array. The focal plane array is the core of an IR camera and gives the camera the ability to see by forming a thermal map of the objects in the environment surrounding the device. Focal plane arrays can have various formats and pixel pitch (usually from 17 μm to 40 μm in 2010). Small format (160×120 pixels and below) arrays are typically used for building inspection, automotive, and surveillance closed circuit television (CCTV) while large format (640×480 to 1024×768) arrays are used for military and security applications. Larger or smaller pixel arrays can be used as well.

An ideal IR detector should be light, low-power, and exhibit ultra-high sensitivity. There are two main types of IR detectors: photonic detectors and thermal detectors. Thermal detectors typically do not require cooling and thus are also called un-cooled detectors. An array of thermal IR detectors is called un-cooled focal plane array (UFPA). The response time of thermal detectors is usually slow. Although the response time of thermal detectors can be improved by reducing the detector size, device scaling impairs the detection sensitivity. The response time and sensitivity of photonic detectors can be much better, but at the expense of requiring cryogenic cooling to suppress the background thermal noise. Therefore, mechanical refrigerators are usually required to maintain a stable operating temperature in photonic sensors. The refrigerator adds to the size, weight, and cost of the sensing platform. For these reasons, there is a critical need for an un-cooled IR detector that has high performance.

SUMMARY OF THE INVENTION

In accordance with one aspect of the invention there is provided an infrared sensor that uses a resonant sensor element comprising a mechanical resonator and an IR absorber arranged to receive and absorb incident infrared radiation. The resonator includes a temperature-responsive material that exhibits pyroelectric and piezoelectric effects. The IR absorber is thermally coupled to the resonator such that the resonator receives thermal energy from at least some of the incident infrared radiation absorbed by the IR absorber. The resonator has at least one resonant characteristic that varies based on the amount of thermal energy received from the IR absorber by the resonator.

In accordance with one aspect of the invention there is provided a method of determining the amount of infrared radiation received at a sensor element that has a mechanical resonator. The method includes the steps of: (a) increasing the quality factor of the resonator using an acoustoelectric effect by applying an electric field across the resonator; (b) altering a resonant characteristic of the resonator using thermal energy received from incident infrared radiation; (c) generating a first signal indicative of the altered resonant characteristics; (d) generating a second signal indicative of a reference resonant characteristics for the resonator; and (e) generating a value indicative of the amount of incident infrared radiation based on a comparison of the first and second signals.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

Described below are different embodiments of a thermal imaging sensor of the uncooled focal plane array type. The imaging sensor is an infrared sensor array comprising pixel sensors each having a resonant characteristic that varies according to the amount of incident infrared radiation impinging on the pixel sensor. Each of the pixel sensors is an individual infrared sensor that comprises a resonant sensor element which exhibits the variable resonant characteristic based on the amount of received IR radiation. Each resonant sensor element includes an IR absorber and a mechanical resonator thermally coupled to the IR absorber. Incident infrared radiation that is received and absorbed by the IR absorber provides thermal energy to the mechanical resonator which uses a temperature-responsive material that exhibits pyroelectric and piezoelectric effects such that the thermal energy alters one or more resonant characteristics of the resonator. One or a number of electrodes are used to provide an input (drive) signal to excite the resonator and to provide a readout signal that permits measurements of the resonant characteristic(s). Apart from the resonant sensor elements that make up the imaging pixel array, the imaging sensor also includes at least one reference sensor element that has a similar construction to that of the resonant sensor elements, but that is substantially insulated from the impinging infrared radiation. By differencing the measured resonant characteristic(s) of the reference sensor element from each of the individual resonant sensor elements, the effect of the impinging infrared radiation can be substantially isolated from other environmental effects, thereby providing more accurate and more sensitive measurements. The imaging sensor can include drive circuitry that applies an RF input signal to excite the resonator and that also provides a superimposed DC bias voltage to improve the quality factor of the resonator. Readout circuitry connected to an electrode of each sensor element is used to measure the resonator's response to the RF input drive signal. Any of a number of different resonant characteristics may be measured and used to determine the amount of incident infrared radiation received, including resonant frequency, resonance amplitude, resonance quality factor, and resonance bandwidth. These and other aspects of the illustrated embodiments are discussed below in greater detail.

Figure 1:
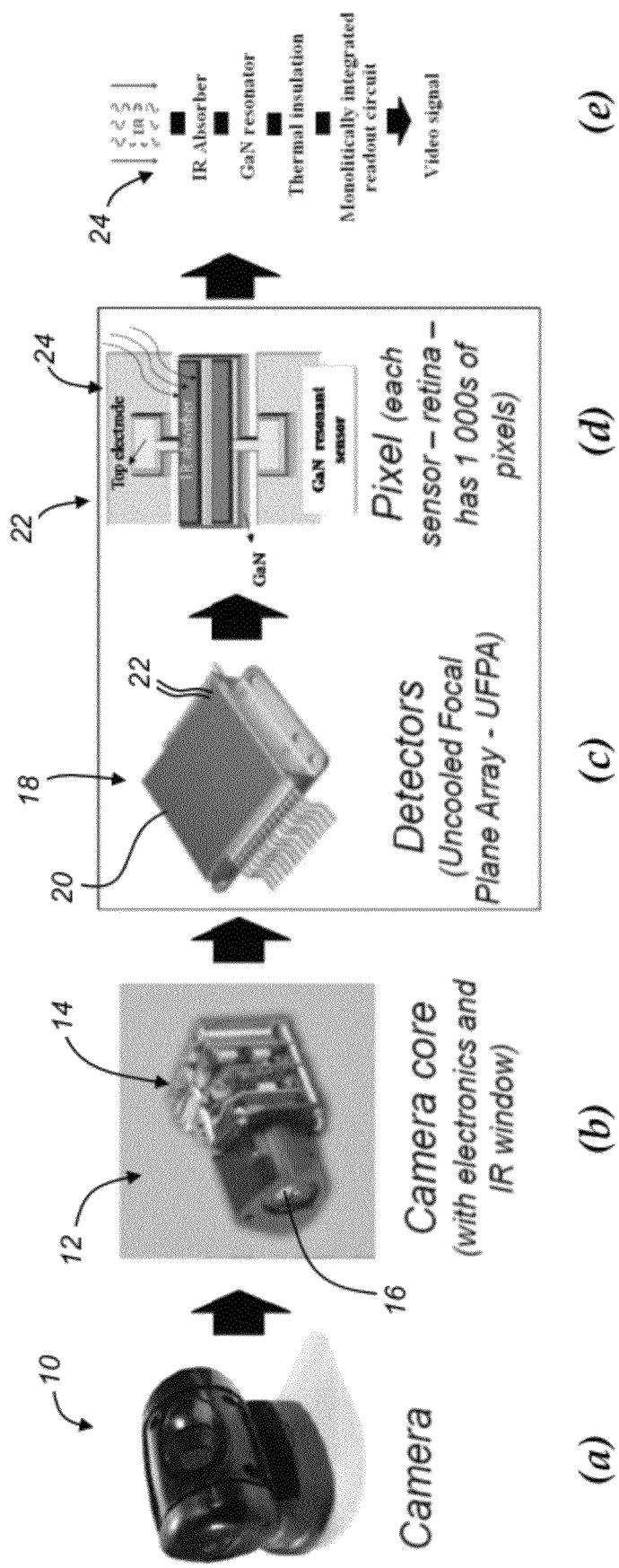
FIG. 1(a) shows a camera using an array of infrared sensing elements constructed in accordance with an embodiment of the invention.
FIG. 1(b) shows the camera core from the camera of FIG. 1(a)
FIG. 1(c) shows an infrared sensor array used in the camera core of FIG. 1(b)
FIG. 1(d) diagrammatically shows a single infrared sensing element of the infrared sensor array of FIG. 1(c)
FIG. 1(e) shows the sensing flow diagram in the sensing element of FIG. 1(d)

Referring to FIGS. 1(*a*)-1(*e*), there is shown an infrared camera 10, FIG. 1(*a*) that includes optics (e.g., a focusing and/or telephoto lens) and a camera core 12, FIG. 1(*b*) which contains camera electronics 14 and an IR window 16 to receive impinging IR radiation. The camera electronics 14 include a thermal imaging sensor or detector 18, FIG. 1(*c*) that comprises an infrared sensor array 20 of pixel sensor elements 22 which can be arranged in a grid with each sensor element being accessible using a row-column addressing approach, such as is known in the art. Various sized pixel arrays can be used depending upon factors such as the application for which the camera will be utilized. For example, in the infrared sensor array of FIG. 1(*c*), the array can have a size of 1024×768 and detector pitch that is expected to be achievable down to only 7 μm using resonant pyroelectric materials (such as gallium nitride and aluminum nitride). A single pixel element 22 comprising a resonant sensor element 24 is shown in FIG. 1(*d*). As will be discussed below, the resonant sensor element 24 is a microelectromechanical systems (MEMS) element that can be fabricated on a silicon or other suitable substrate. As shown in FIG. 1(*e*), the sensor element 24 includes a stackup of layers that includes an IR absorber and a mechanical resonator formed from a GaN or other temperature-responsive material that receives thermal energy from the IR absorber. The resonator is suspended over a cavity which helps thermally isolate the resonator. A monolithically integrated readout circuit detects changes in a resonant characteristic of the resonator and, using the detected changes for each of the sensor elements in the array, provides a thermal image that, with a succession of such images, provides a video signal.

Figure 2:
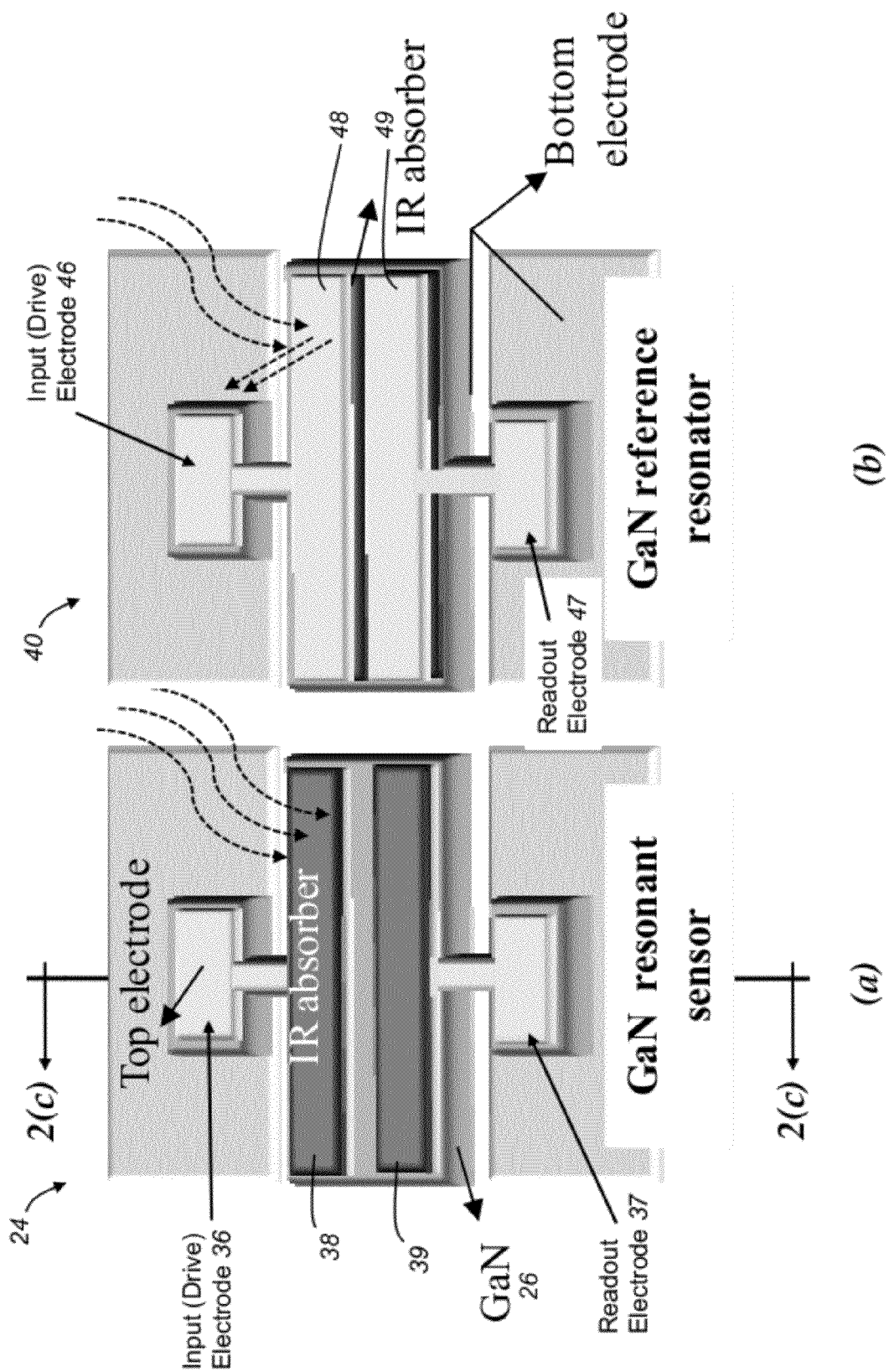
FIG. 2(a) shows the infrared sensing element of FIG. 1(d) in more detail.
FIG. 2(b) diagrammatically shows a reference sensing element that is used in the sensor array of FIG. 1(c)
FIG. 2(c) is a diagrammatic view taken along the 2(c)-2(c) line of FIG. 2(a)
FIG. 2(d) depicts a method of using the infrared and reference sensing elements of FIGS. 2(a) and 2(b)
Figure 2C:
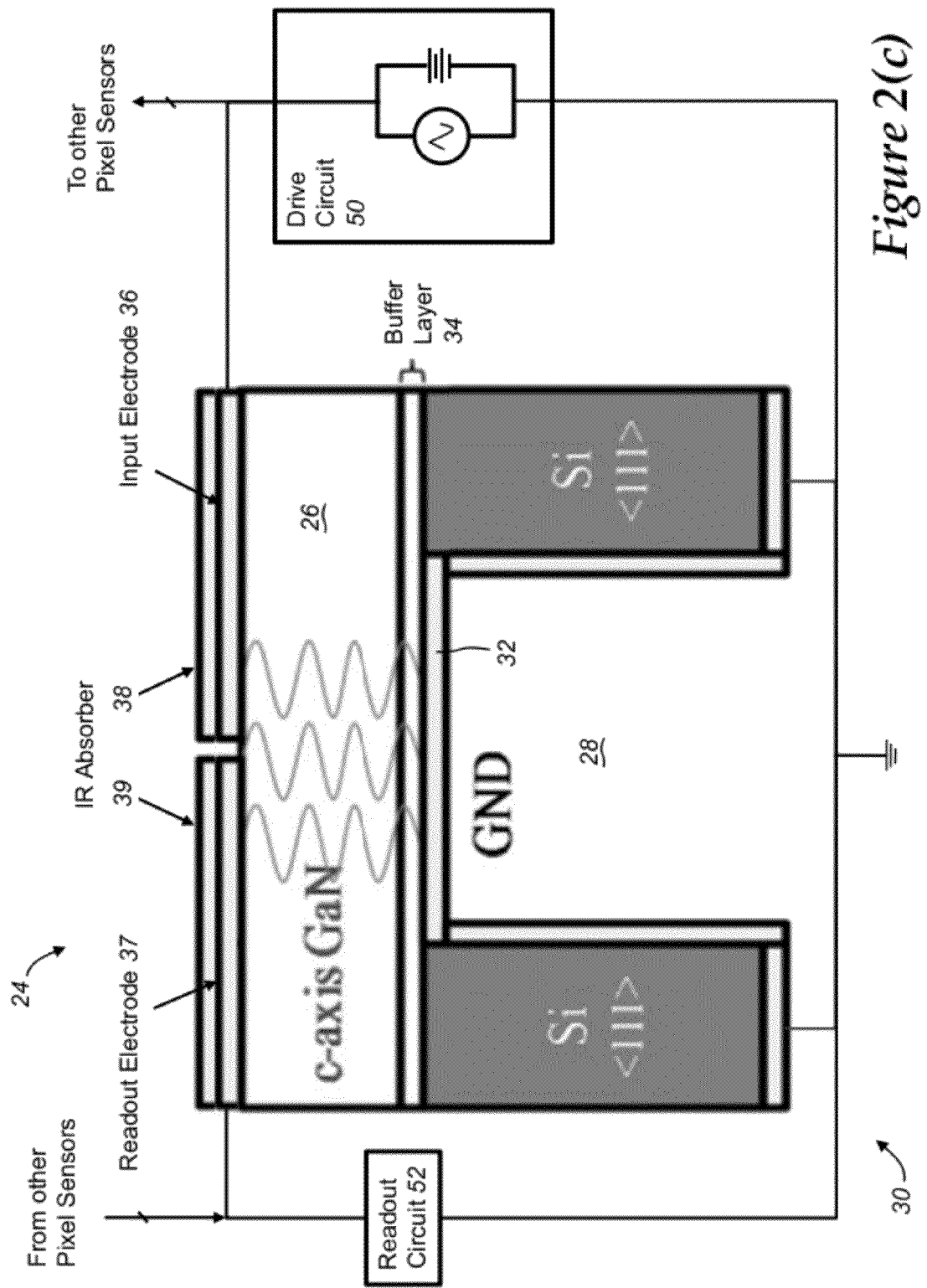
Figure 2D:
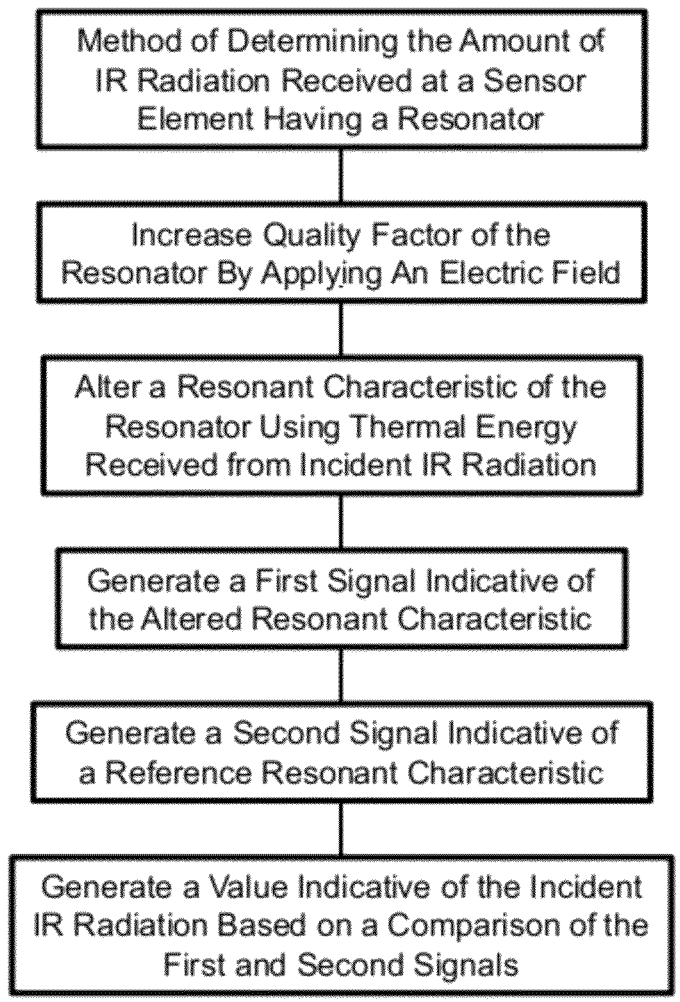

FIG. 2(*a*) depicts a top (plan) view of a single resonant sensor element 24 such as is shown in FIG. 1(*d*). FIG. 2(*c*) depicts a cross-sectional view taken along the 2(*c*)-2(*c*) line of FIG. 2(*a*). These figures are diagrammatic only and do not indicate relative scale of the different components of the sensor element. The resonant sensor element (identified as GaN resonant sensor) principally comprises a GaN layer 26 suspended over an open cavity 28 such that it acts as a mechanical resonator 30. A lower (or bottom) ground electrode 32 (GND) is coupled to the resonator 30 by way of an electrically isolating buffer layer 34. A pair of upper (or top) electrodes 36, 37 is located over the GaN layer 26, and each has an IR absorber 38, 39 formed over the electrode. The two upper electrodes 36, 37 provide two electrical ports, permitting one electrode (36) to be used as an input port to provide the RF drive and DC bias signals, and the other electrode (37) to be used as a readout port to measure one or more resonant characteristics. Thus, for example, an input frequency sweep covering a range of RF frequencies around the device's resonant frequency can be inputted into the first upper electrode 36 and the second upper electrode 37 then used to measure the resonator's response at each frequency. The input may be provided using a drive circuit 50 that may include both a frequency-adjustable sinusoidal or other periodic waveform as well as a DC bias, as indicated in FIG. 2(*c*). A readout circuit 52 senses the voltage at the readout electrode 37 relative to ground 32, and the measured voltage may then be further analyzed in any of a number of different ways (e.g., by looking for changes in one or more resonant characteristics of the resonator) to extract information concerning the amount of incident infrared radiation.

Any suitable number n of input electrodes can be used; for example, to provide multiple input driving signals and/or multiple readout signals. If multiple upper electrodes are used, then they can be spaced as shown in FIG. 2(*a*), or can be interleaved, interdigitated, or otherwise applied to the resonator as suitable for a particular application. It is to be noted that the device can also be implemented in a one-port configuration, where only one top electrode is used for application and sensing of the signal. Although GaN is used in this embodiment, at least some other temperature-sensitive materials can be used; for example AlN. These materials are strong piezo- and pyroelectric materials that can be grown or sputtered on a silicon substrate. In other embodiments, ZnO, lithium niobate, BST, or PZT can be used as the resonator material. In some embodiments, a material that also exhibits electrostrictive effects may be used, GaN being an example of a temperature-sensitive material that exhibits all three (piezoelectric, pyroelectric, and electrostrictive) effects.

In use, the physical processes involved with the operation of the resonant sensor element starts with infrared radiation being absorbed in the thin film IR absorbers 38, 39 and converted into heat (thermal energy). The resonator 30 is suspended over a deep cavity 28 such that a temperature gradient is developed along the thickness direction of the GaN layer 26. Because of the pyroelectric effect in GaN, a temperature gradient will induce an electric field across the thickness, which in turn results in a strain (dimension change) in the GaN film due to the piezoelectric effect. The change in resonator physical dimension will cause a shift in the resonant characteristics of the GaN resonator. The IR source power is extracted from the shift in the resonance frequency and amplitude of the exposed GaN resonator as compared to a reference sensing element 40, shown in FIG. 2(*b*). The reference sensing element 40 is operated in the same mode as the resonant sensor elements with the same layers in the resonance stack. That is, it has a GaN layer 42 over a buffer layer and ground electrode located above an underlying cavity (all not shown), upper input and readout electrodes 46, 47, and respective IR absorbers 48, 49. However, the sequence of the stack in the reference sensor element 40 is changed such that the IR absorbing layer blocked by the top electrodes 46, 47. That is, the IR absorbers 48, 49 are located underneath the upper electrodes 46, 47 which are IR reflective so that no incident IR radiation will impinge upon the IR absorbers 48, 49. Gold can be used as the top electrode because of its very high IR reflectivity of approximately 95%. Therefore, IR radiation will cause a minimal shift in the resonance characteristic of the reference sensor element 40, while it results in a large shift in the resonance frequency of all other resonators (26, etc.) in the array. Alternatively, the reference sensing element 40 can have all the same layers in the stack as the resonator 30 except for the IR absorbing layers 48, 49. Only one reference sensor element is used for the array, although in other embodiments, two or more can be used and may be distributed around the array.

Thus, with reference to FIG. 2(*d*), there is provided a method of determining the amount of infrared radiation received at a sensor element that comprises a resonator made from a material that exhibits pyroelectric and piezoelectric effects. The method includes the steps of: (a) increasing the quality factor of the resonator using an acoustoelectric effect by applying an electric field across the resonator; (b) altering a resonant characteristic of the resonator using thermal energy received from incident infrared radiation; (c) generating a first signal indicative of the altered resonant characteristics; (d) generating a second signal indicative of a reference resonant characteristics for the resonator; and (e) generating a value indicative of the amount of incident infrared radiation based on a comparison of the first and second signals. As noted above and shown in FIG. 2(*c*), step (a) can be carried out by applying a DC voltage to the upper input electrode of the resonant sensor element of FIG. 2(*a*). Step (b) can be carried out using the IR absorber layer over the GaN resonator to receive and absorb incident IR radiation that is then thermally conducted to the GaN resonator via the upper electrodes. Step (c) can be carried out using the readout circuit by measuring the RF signal from the second (readout) upper electrode of the resonant sensor element. Step (d) can similarly be carried out using the reference sensor element's readout electrode, and step (e) can be carried out by the readout circuitry or using another circuit to output a value indicative of the amount of received IR radiation. Doing this for each of the resonant sensor elements in the detector array permits the output of a complete thermal image. Any of a number of different resonant characteristics may be used in this method, including resonant frequency, resonance amplitude, resonance quality factor, and resonance bandwidth.

As will be evident to those skilled in the art, known fabrication techniques may be used to fabricate the resonant sensor element 24 and reference sensor element 40, as well as fabricating them as a part of an infrared sensor array 20. Also, the construction and use of the drive and readout circuitry 50, 52 and other camera electronics 14 will be apparent to those skilled in the art.

To obtain a high sensitivity, the sensor may be constructed to have a large induced frequency shift, and this may be achieved by using a material having large pyroelectric and piezoelectric coefficients, but a small permittivity. Most pyroelectric materials, such as $LiTaO_3$, with large a pyroelectric coefficient, also exhibit a large electrical permittivity, resulting in reduced thermal sensitivity. In contrast, GaN (and AlN) possess a small permittivity and large pyroelectric coefficients. It has been shown that GaN can reach or even exceed the performance of the best-known pyroelectric/piezoelectric material, $LiTaO_3$. Thus, a large frequency shift is expected to be observed in GaN resonators upon IR exposure. Furthermore, GaN has been shown to exhibit significant second-order piezoelectric effects, also known as electrostriction. A temperature differential between the irradiated surface and the bottom surface of the GaN film will result in the spontaneous generation of electric surface charge due to the pyroelectric properties of GaN, and subsequently a voltage across the thickness of the device. This voltage changes the acoustic velocity of the material by a significant margin, due to the piezoelectric and electrostrictive effect in GaN. The change is the acoustic velocity directly translated to a shift in the resonant frequency, which is sensed by the top electrodes 46, 47. Electrostriction in GaN is not widely researched. However, even assuming conservative values for the electrostrictive coefficients in GaN, a frequency shift much larger than that achieved using temperature coefficient of frequency (TCF) can be achieved.

Because the frequency sensitivity of a resonant sensor also increases with the Q of the resonator, better sensor response may be obtained by using GaN micro-resonators having high Qs. This can be achieved by the application of the acoustoelectric effect to obtain the highest Q in air. Acoustoelectric amplification, which is most effective in piezoelectric semiconductors, occurs when charge carriers drift under the influence of an applied electric field with a velocity higher than that of an acoustic wave thus transferring energy to the lower velocity phonons. In other words, using phonon-electron interactions enables the amplification of the acoustic wave and increases the Q.

Figure 3:
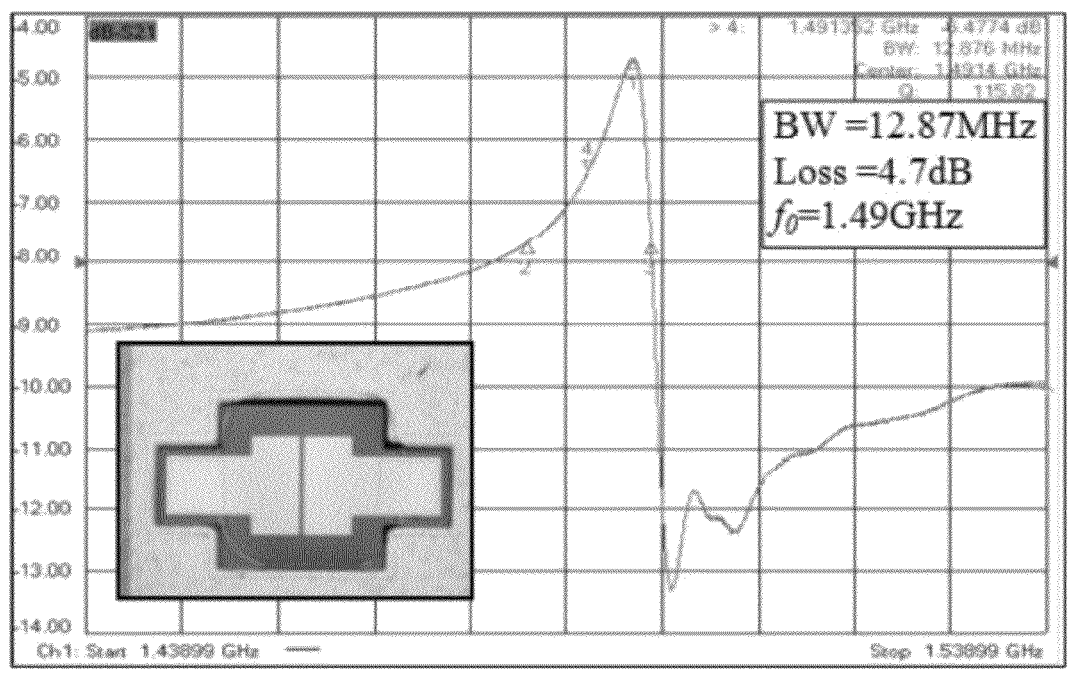
FIG. 3 is a plot showing the measured frequency response of a 2.2 μm thick prototype bulk-mode GaN filter at 1.5 GHz.
Figure 4:
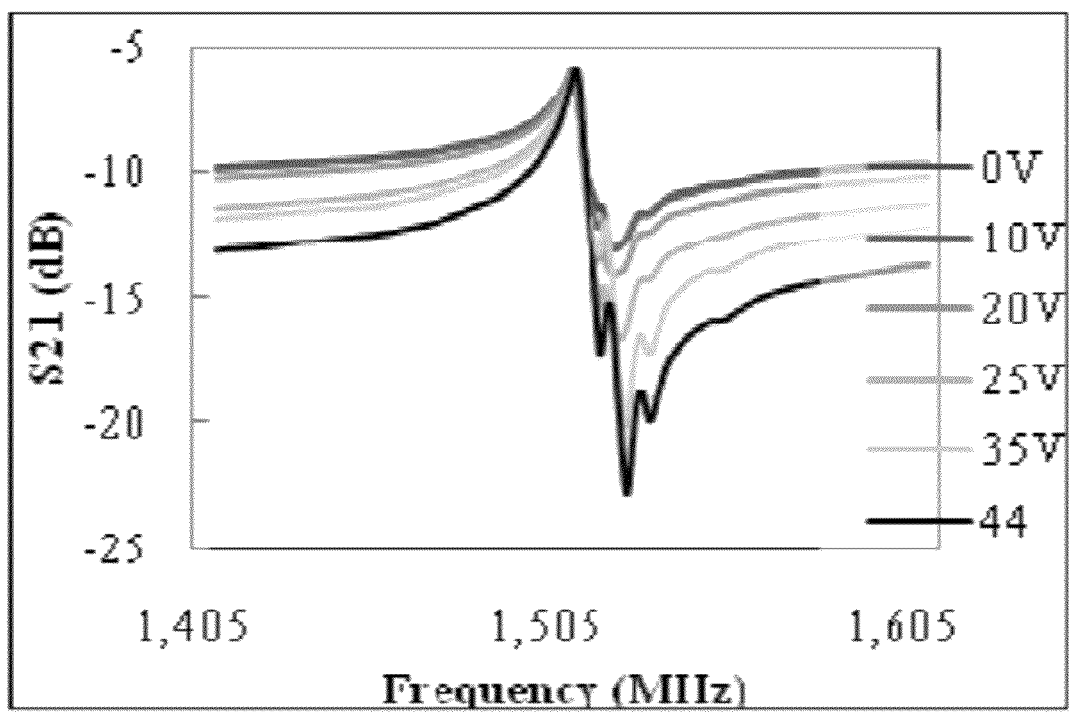
FIG. 4 is a plot showing results of an experimental demonstration of the acoustoelectric effect in tested GaN filters.

Acoustoelectric Q-amplification in thickness-mode GaN micromechanical filters may be obtained by applying a DC bias which may be done using the drive circuitry 50 shown in FIG. 2(*c*). This acoustoelectric Q-amplification effect has been observed in bulk-mode GaN filters having a configuration similar to that of sensing element 24. The GaN devices tested were fabricated on a silicon substrate and their frequency response was measured and is shown in FIG. 3. Acoustic gain was observed by applying DC electric fields to the top input electrode. The frequency response of this filter with increasing DC bias is shown in FIG. 4. As the DC voltage increases, the charge carrier velocity increases, resulting in simultaneous improvement of the Q and reduction of the insertion loss. The unloaded Q of the coupled resonator filter improved from 47 to 160 with the application of 20 V/µm, thus providing amplification by a value as large as 242%.

Figure 5A:
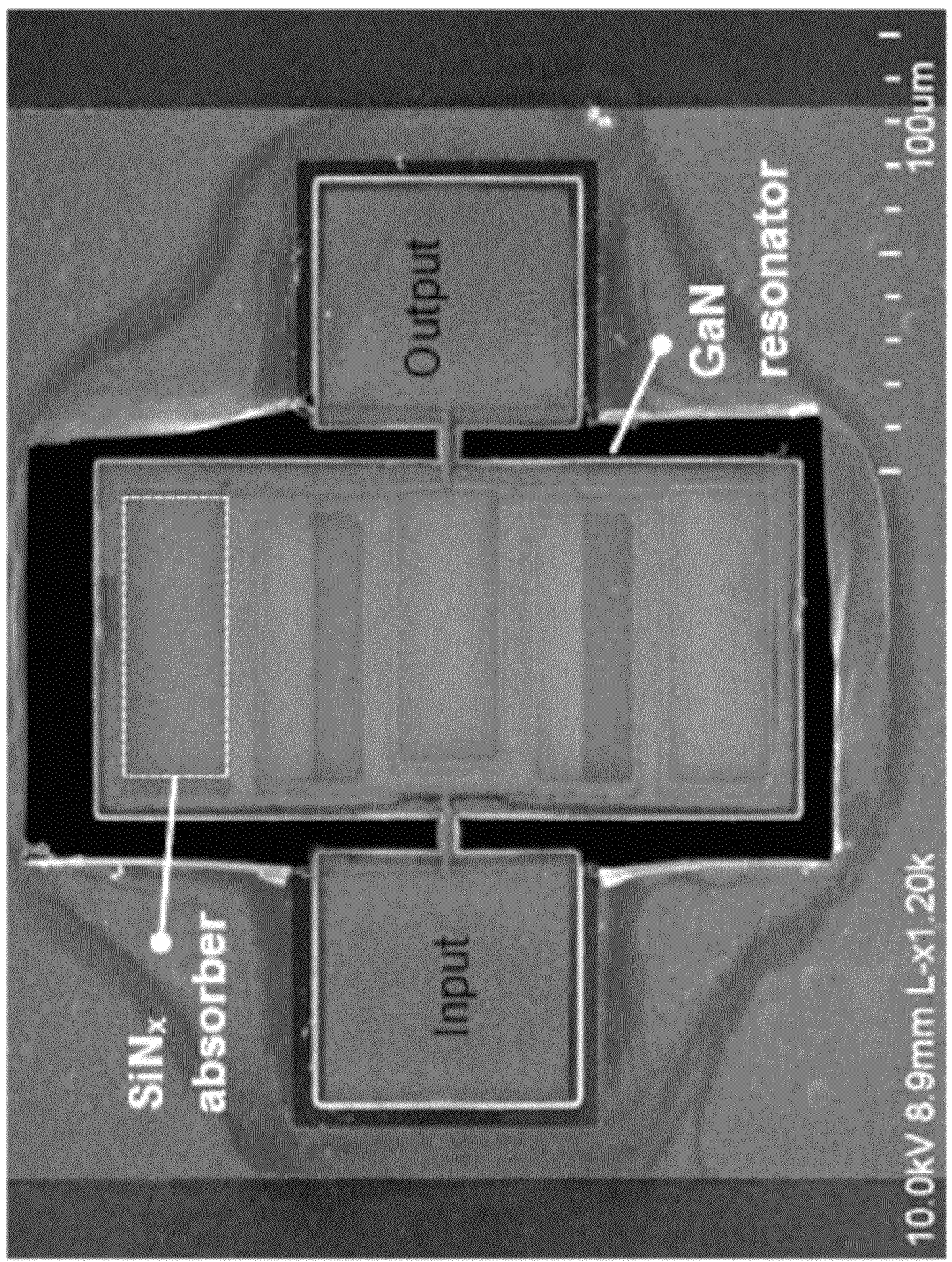
FIG. 5(a) is an SEM image of a fabricated 160 μm×80 μm×2.15 μm GaN resonator with an $SiN_x$ absorber.
Figure 5B:
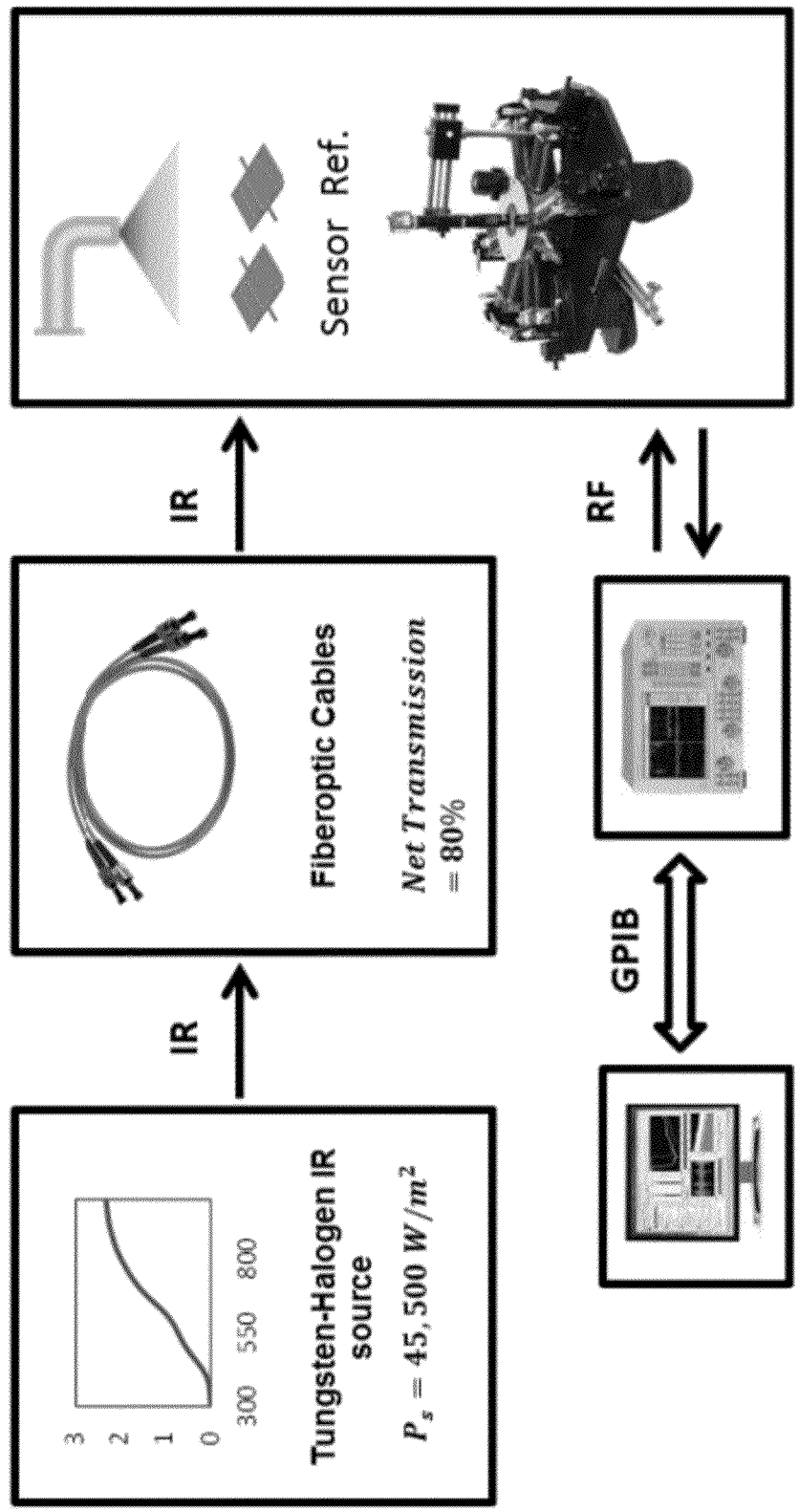
FIG. 5(b) is a schematic showing the IR measurement setup used for measurements of both the fabricated GaN resonator of FIG. 5(a) as well as a reference sensor using the same measurement procedure for each.

A sensing element was fabricated and tested, comprising a GaN resonator as described above for sensing element 24. A scanning electron micrograph (SEM) of the fabricated device is shown in FIG. 5(*a*). The experimental setup for measuring the frequency response of the device is shown in FIG. 5(*b*). The GaN sensor was placed in a temperature controlled probe station. IR energy was provided by a Tungsten-Halogen lamp and was coupled into the probe station using optical fibers. The RF performance of the GaN resonator was measured using an Agilent™ Vector Network Analyzer.

Figure 6A:
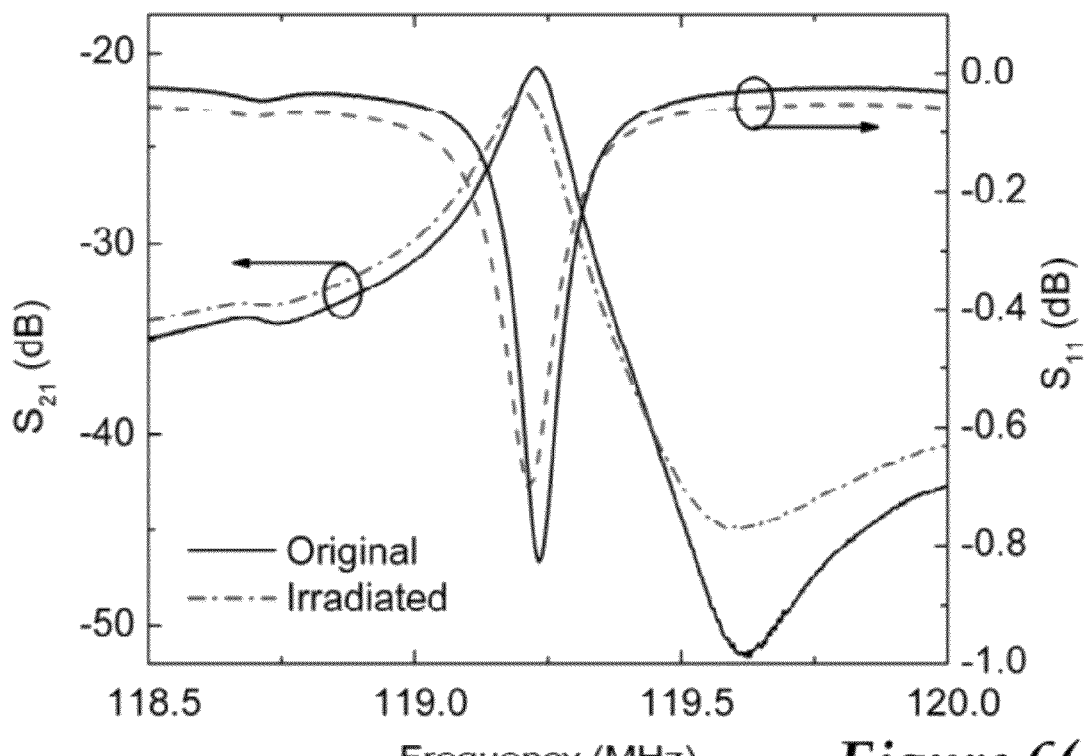
FIG. 6(a) depicts the change in frequency response of the GaN resonator of FIG. 5(a) operated at its 5th length-extensional mode upon radiation with ~56 μW IR power.
Figure 6B:
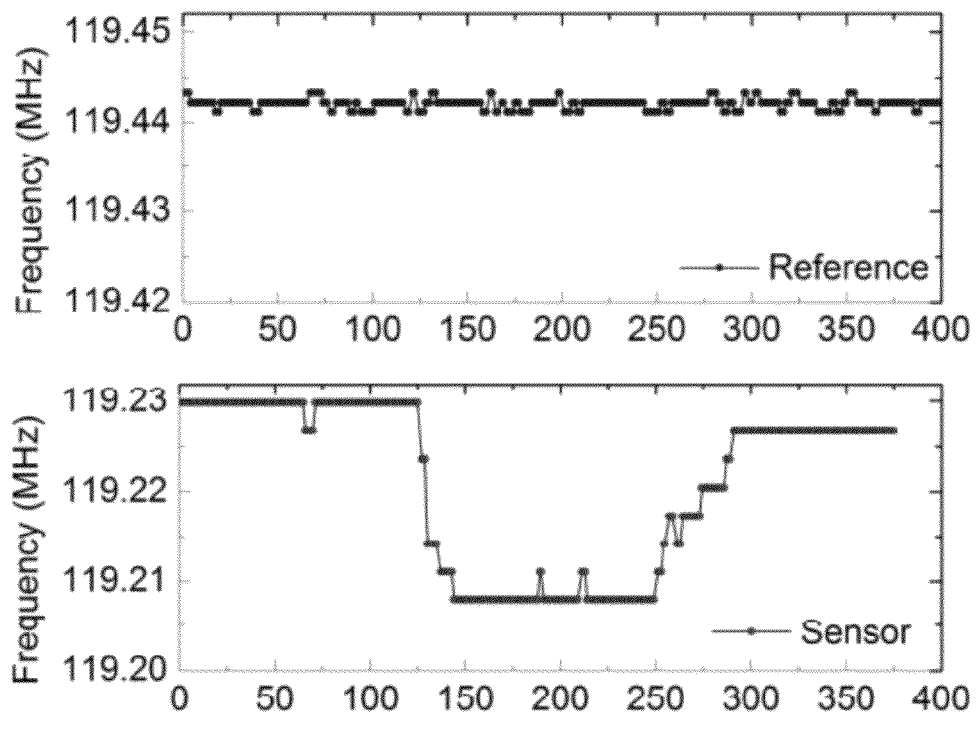
FIG. 6(b) shows the change in frequency of the FIG. 5(a) GaN resonator and the reference resonator on application of an IR signal.

The nominal RF response of the tested GaN resonator and the subsequent change when it was subject to IR radiation is given in FIG. 6(*a*). FIG. 6(*b*) shows the difference in the response of a sensor (with the $SiN_x$ absorber) and a reference resonator (without the coating, but otherwise identical). As indicated, the reference resonator remained invariant while the sensor exhibited a large change of −21.8 kHz (−183 ppm). The change in frequency upon IR radiation was 10% of the beat frequency ($f_{reference}-f_{sensor}$). The beat frequency can be accurately detected using the resonators in an oscillator loop and a mixer circuit. The oscillator uses an amplifier, which can be built using high electron mobility transistors (HEMTs) monolithically integrated with the GaN resonators on the same die.

Figure 7:
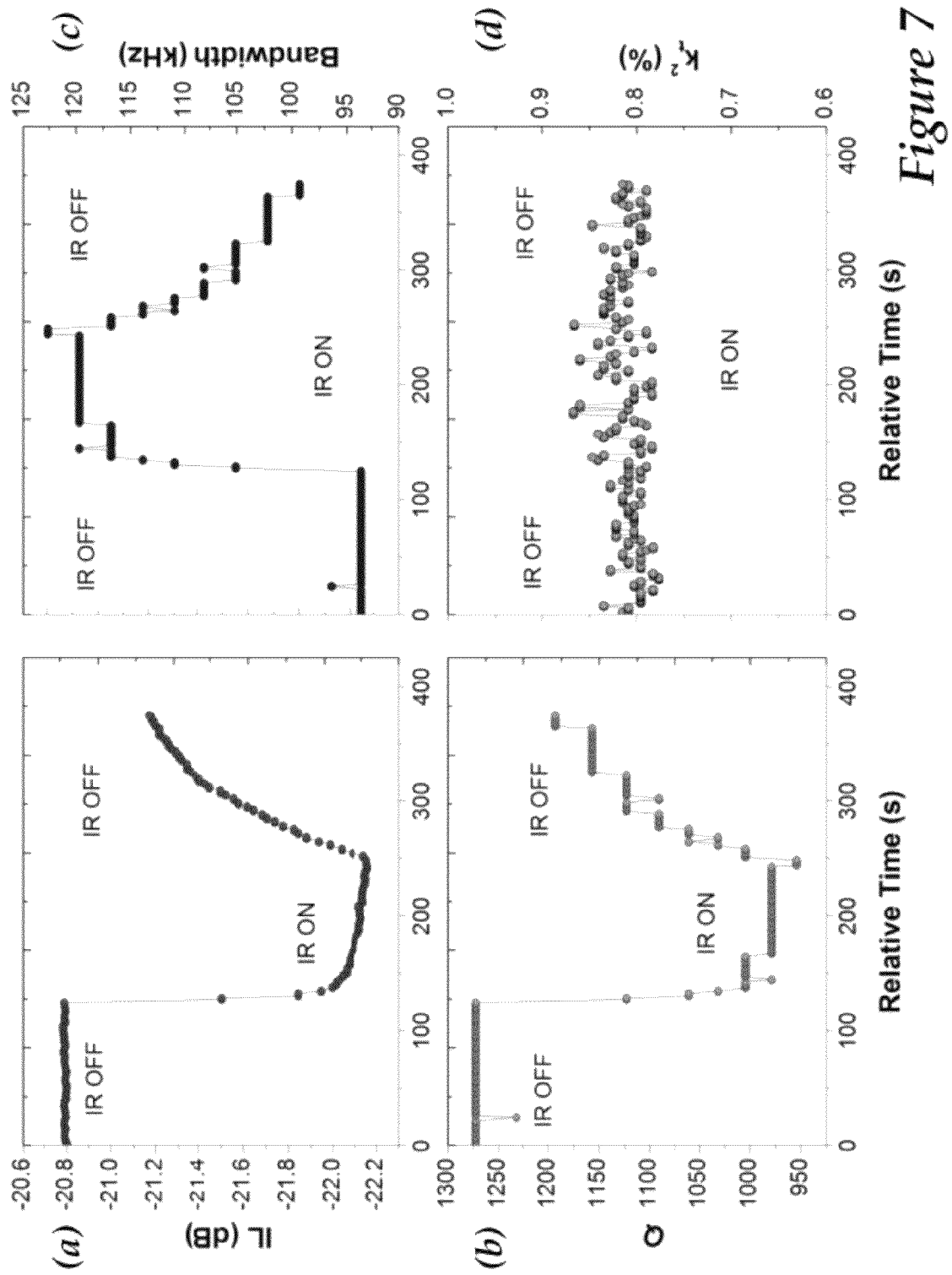
FIGS. 7(a)-(d) show (a) Insertion loss, (b) Q, (c) bandwidth, and (d) effective coupling coefficient ($k_t^2$) of the resonator as functions of time when the IR signal is switched ON and OFF.

Apart from the change in frequency, the tested resonator underwent various other changes in its frequency response. The quality factor (Q) and the insertion loss (IL) both degraded, and bandwidth increased due to the addition of the thermal energy to the resonant system. FIG. 7 depicts the change in these parameters. The effective coupling coefficient, which is a parameter intrinsic to the GaN film, remained invariant as expected. These measurements were acquired concurrently with the frequency change of the sensor. Changes in these parameters may be used in different types of sensing schemes. Therefore, other interface circuitry measuring various resonator parameters may be used to detect the incident IR power.

Based on the power output spectrum of the IR source, and taking into consideration fiber losses, it is possible to calculate the power density incident on the resonator, subsequent thermal and the changes in the frequency response based on all the mechanisms mentioned above.

The design of the resonating stack may be optimized for maximum sensitivity. In addition, two-dimensional electron gas (2DEG) can be used as one of the electrode. The 2DEG has virtually zero thickness and therefore larger thermal resistivity can be achieved if metal electrodes are replaced with 2DEG electrodes.

The proposed IR detector (individually or in array) can be used in diverse applications. Applications that need moderate NEDT values include: optical power meter, radiation thermometer, flame monitors, gas analyzer, moisture analyzer, intrusion alarm devices, and automatic door opener. Some enabling applications that require NEDT values better than 50 mK include remote sensing, sorting devices (or object identification), human body detection (wavelength of 10 μm, speed better than 10 Hz, and NEDT values better than 70 mK), Spectro-photometers (wide spectral response, high sensitivity, fast time response), optical communication, and IR imaging devices.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An infrared sensor, comprising:
a resonant sensor element comprising a mechanical resonator and an IR absorber arranged to receive and absorb incident infrared radiation, said resonator comprising a temperature-responsive material that exhibits pyroelectric and piezoelectric effects, and said IR absorber being thermally coupled to said resonator such that said resonator receives thermal energy from at least some of the incident infrared radiation absorbed by said IR absorber;
a first electrode and drive circuitry connected to said first electrode that applies an RF input signal to said first electrode to excite said mechanical resonator; and
a second electrode and readout circuitry connected to said second electrode to measure one or more resonant characteristics of said mechanical resonator;
wherein said resonator has at least one resonant characteristic that varies based on the amount of thermal energy received from said IR absorber by said resonator.

2. An infrared sensor as defined in claim 1, wherein said temperature-responsive material exhibits electrostrictive effects.

3. An infrared sensor as defined in claim 1, wherein said resonator comprises a first layer formed from the temperature-responsive material and said IR absorber comprises a second layer formed from infrared absorbent material that overlies said first layer.

4. An infrared sensor as defined in claim 3, wherein said first electrode comprises an upper electrode located above the first layer and said second electrode comprises a lower electrode located below the first layer.

5. An infrared sensor as defined in claim 3, wherein said first electrode comprises an upper electrode located between said first and second layers such that the absorbed infrared radiation received by said resonator is transferred from said IR absorber to said resonator via said upper electrode.

6. An infrared sensor as defined in claim 5, further comprising a lower electrode located below said upper electrode, and further wherein said upper electrode is a first upper electrode and wherein said second electrode comprises a second upper electrode located above said first layer and being electrically isolated from said first upper electrode.

7. An infrared sensor array comprising a plurality of infrared sensors, at least one of which is constructed as set forth in claim 1.

8. A sensor array as defined in claim 7, further comprising a reference sensor element that is separate from said resonant sensor elements and that includes top and bottom electrodes and a layer of the temperature-responsive material located between said top and bottom electrodes, wherein said temperature-responsive material of said reference sensor element is thermally isolated from the incident infrared radiation.

9. A sensor array as defined in claim 8, wherein said temperature-responsive material of the reference sensor is thermally isolated from the incident radiation by at least one of said top and bottom electrodes.

10. A sensor array as defined in claim 8, wherein said reference sensor element further comprises a layer of infrared absorbent material located between said top and bottom electrodes such that said top electrode overlies said infrared absorbent material, and wherein said top electrode comprises an IR reflective material that prevents substantially all of the incident infrared radiation from reaching said infrared absorbent material of said reference sensor element.

11. A sensor array as defined in claim 8, wherein said top electrode is a first top electrode and wherein said reference sensor element further includes a second top electrode located above said temperature-responsive material and being electrically isolated from said first top electrode.

12. A sensor element as defined in claim 1, wherein the mechanical resonator comprises GaN, AlN, ZnO, lithium niobate, BST, or PZT.

13. A sensor element as defined in claim 12, wherein the IR absorber comprises carbon nanotubes.

14. An infrared sensor as defined in claim 1, wherein said drive circuitry applies both a DC bias and an RF input signal to said first electrode.

15. An infrared sensor, comprising:
- a resonant sensor element comprising a mechanical resonator and an IR absorber arranged to receive and absorb incident infrared radiation, said resonator comprising a first layer formed of a temperature-responsive material that exhibits pyroelectric and piezoelectric effects, and said IR absorber comprising a second layer formed from infrared absorbent material that overlies the first layer, said IR absorber being thermally coupled to said resonator such that said resonator receives thermal energy from at least some of the incident infrared radiation absorbed by said IR absorber, and wherein said resonator has at least one resonant characteristic that varies based on the amount of thermal energy received from said IR absorber by said resonator;
- a first upper electrode located between said first and second layers such that the absorbed infrared radiation received by said resonator is transferred from said IR absorber to said resonator via said upper electrode;
- a second upper electrode located above said first layer and being electrically isolated from said first upper electrode;
- a lower electrode located below said first upper electrode; and
- drive circuitry that applies an RF input signal to said first upper electrode, and readout circuitry connected to said second upper electrode to measure the one or more resonant characteristics of said resonator.

16. An infrared sensor as defined in claim 15, wherein said drive circuitry applies both a DC bias and an RF input signal to said first upper electrode.

17. An infrared sensor array comprising:
- a plurality of infrared sensors, at least one of which comprises a resonant sensor element comprising
  - a mechanical resonator and an IR absorber arranged to receive and absorb incident infrared radiation, said resonator comprising a first layer formed of a temperature-responsive material that exhibits pyroelectric and piezoelectric effects, and said IR absorber comprising a second layer formed from infrared absorbent material that overlies the first layer, said IR absorber being thermally coupled to said resonator such that said resonator receives thermal energy from at least some of the incident infrared radiation absorbed by said IR absorber, and wherein said resonator has at least one resonant characteristic that varies based on the amount of thermal energy received from said IR absorber by said resonator;
  - a first upper electrode located between said first and second layers such that the absorbed infrared radiation received by said resonator is transferred from said IR absorber to said resonator via said upper electrode;
  - a second upper electrode located above said first layer and being electrically isolated from said first upper electrode;
  - a lower electrode located below said first upper electrode;
- a reference sensor element that is separate from said resonant sensor elements and that includes a first top electrode, a bottom electrode, and a layer of the temperature-responsive material located between said top and bottom electrodes, wherein said temperature-responsive material of said reference sensor element is thermally isolated from the incident infrared radiation, and a second top electrode located above said temperature-responsive material and being electrically isolated from said first top electrode; and
- drive circuitry connected to said first upper electrode of said resonant sensor element and said first top electrode of said reference sensor element to provide an input drive signal, and further comprising readout circuitry connected to said second upper electrode of said resonant sensor element and said second top electrode of said reference sensor element that detects a difference in one or more resonant characteristics of each of said resonant sensor elements relative to said reference sensor element.

18. A sensor array as defined in claim 17, wherein said one or more resonant characteristics comprises one or more of the following characteristics: resonant frequency, resonance amplitude, resonance quality factor, and resonance bandwidth.

* * * * *